Patented Dec. 28, 1948

2,457,141

UNITED STATES PATENT OFFICE 2,457,141

METHOD OF PREPARING DOUBLE SALTS OF ASCORBO-SALICYLATE

Joel G. Freeman, Mount Vernon, N. Y., assignor to Pharmaceutical Organics Inc., New York, N. Y., a corporation of Delaware No Drawing. Application June 12, 1946, Serial No. 676,340

10 Claims. (Cl. 260—344.5)

This invention relates to new and useful improvements in the preparation of soluble double salts of ascorbic acid and salicylic compounds or their derivatives, hereafter sometimes referred to as ascorbo-salicylates. It has previously been shown that a calcium double salt of ascorbic and acetyl-salicylic acid may be formed and possesses valuable pharmaceutical properties.

In U. S. Patent No. 2,159,214 there is described a process of preparing calcium ascorbo-acetyl-salicylate. The method substantially consists in reacting a mixture of acetyl-salicylic and ascorbic acid with slaked calcium oxide in an alcoholic solution. In view of the low solubility of ascorbic acid in alcohol, large volumes of this solvent are required to carry out the described method, and cumbersome evaporation and recrystallization processes have to be applied to obtain an acceptable product. On account of these factors the method is generally impractical and exceptionally expensive. The yields hardly attain 50% of the theory, which adds to the uneconomical character of this mode of preparation. Finally, it is accompanied by an undesirable side reaction of the alcohol with part of the acetic acid split off from the acetyl-salicylate and leading to the formation of ethyl-acetate. In fact, products made by the described method usually have a strong odor of acetic ethyl ester.

It is, therefore, one object of the present invention to provide a new mode of preparation of double salts of ascorbic and salicylic acid or their derivatives in general, and of calcium ascorbo-acetylsalicylate in particular, by a chemical reaction wherein the use of alcohol is dispensed with entirely.

It is another object of the present invention to devise a new and improved method of producing the aforementioned double salts by a simplified and economical procedure which will practically result in the formation of a substantially pure product without the subsequent requirement of elaborate purification.

Still another object of my invention is to prepare double salts of ascorbic and salicyclic acid or its derivatives in such a manner that the reaction product lends itself to tabletting and similar operations without preliminary drying.

Yet, another object of the present invention is to prepare the above mentioned double salts by a novel method which will ensure a yield of substantially the theoretical amount to be expected on the basis of the proportions of the reacting ingredients.

A still further object of the present invention is to produce ascorbo-salicylates and salts of ascorbo-salicylic acid derivatives which are more pure and stable than the one previously described.

The above and other objects and advantages may be best understood from the following disclosure which sets forth how the invention may be carried out.

I have found that soluble double salts of ascorbic acid and salicylates or their derivatives and aspecially calcium ascorbo-acetyl-salicylate may be prepared by reacting ascorbic acid and salicylic compounds carrying a free reactive carboxyl group with calcium hydroxide or an equivalent base in an aqueous medium. One of the features of my invention resides in the discovery that this reaction will take place with a relatively small amount of water, such as is just necessary to produce a pasty consistency of the reaction mixture, but is in excess of that required to complete the reaction. In this manner, the bulk of the reaction mixture is reduced to a minimum and the resulting product contains such a small quantity of water that it can either be directly used for tabletting or dried for other purposes in a relatively short time by vacuum at reduced temperature or at room temperature under ordinary pressure. A variety of means may be employed for the drying without exposing the material to disintegration by overheating or other damaging operations.

I have further made the observation that during the reaction of salicylic compounds with ascorbic acid in an aqueous medium, a discoloration occurs which may impart a violet or bluish violet tinge to the reaction product. This phenomenon is probably attributable to an oxidation which partly effects the relatively labile ascorbic acid and thereby reduces its content in the final composition. I have found that this discoloration can be inhibited if a soluble reducing agent is incorporated into the reaction mixture. A great number of soluble reducing substances have proven valuable for this purpose, such as, for instance, sodium-sulfite, sodium bisulfite, sodium hydrosulfite and other sulphur containing compounds of generally reducing properties. In some cases it may also be preferable to impede the oxidation by working in an inert atmosphere with the exclusion of oxygen, as for instance in nitrogen gas.

As the reaction is of exothermal character and the heat developed will concentrate upon a relatively small volume, precautions are to be taken to avoid overheating of the reaction mixture.

This can be accomplished by diversified means, such as simple ice cooled vessels, water cooled jacketed vessels and other conventional refrigerating devices. Another way of keeping the temperature at a moderate level is to control the violence of the reaction by adding to the mixture a speed retarding agent in form of a polyhydroxy-alcohol such as glycol or glycerol. The alcohol may optionally be added either to the water or to the powdered mix.

The calcium hydroxide used to carry out the reaction should be relatively pure and substantially free of iron compounds. The amounts to be employed may vary within narrow limits, though in some cases within a range of 8 to 15% in excess of the stoichiometric amount. A lesser quantity will result in a product of acid reaction, while the use of a larger excess will shift the pH of the final product towards the neutral or alkaline side. In the place of calcium hydroxide slaked lime of equivalent calcium-hydroxide content may be used in the like manner.

The quantity of water best suitable for my improved process should be such as to be sufficient and not in excess to bring about a pasty or dough-like consistency of the mixture, but in excess of that required to complete the reaction.

The following examples will illustrate how my improved process may be carried out and in what proportions the reacting ingredients are to be combined.

*Example 1.*—18 grams of acetyl salicylic acid are mixed together in a mortar with 18.2 grams of ascorbic acid and 8.5 grams of calcium hydroxide powder (95%). The ingredients are thoroughly mixed to a relatively uniform state. 7.5 cc. of cold water are then added with stirring the mixture until a pasty mass is formed. The mortar may be surrounded by a cooling mixture in order to limit the rise in temperature. The temperature may rise from 10 to 20° C., depending on the amount of material used in the reaction or on the extent or degree of cooling. In the absence of a reducing agent or an inert gas, a light violet coloration may occur. This color becomes lighter or may disappear on drying to give a creamy or grayish white product having an ascorbic acid content of 36 to 40% and a calcium content of from 10 to 11%. The yield is approximately 44 grams of a product which is substantially completely soluble in water in the proportion of about 1:10. The pH of this solution is about 6.8 to 7.5, but may vary to a moderate degree up or down depending on the amount of calcium hydroxide applied. In order to reduce the speed of the reaction, some glycerol may be added to the water or to the powdered mix.

*Example 2.*—18 grams of acetyl-salicylic acid, 18.2 grams of ascorbic acid, and 9 grams of calcium hydroxide powder (95%) are mixed in a mortar or other suitable vessel. 11 cc. of an aqueous glycerol solution containing 20% glycerol are added to the powdered mix with simultaneous pounding the material to make a substantially pasty mass. The mixing operation is preferably carried out in an inert atmosphere, such as nitrogen gas to reduce or inhibit color formation. Ice is used to cool the vessel in order to prevent excessive rise in temperature. It is advisable to keep the temperature below a maximum of 40 to 42° C. The pasty mixture is then transferred to a tray and dried in a vacuum desiccator over calcium chloride of any other suitable drying agent. A yield of 44 grams of a creamy white semi-granular product is obtained having a vitamin C content of approximately 36%. The pH of a 10% solution is about 9.5.

*Example 3.*—18 grams of acetyl salicylic acid, 18.2 grams of ascorbic acid, 8.5 grams of calcium hydroxide powder (95%), and 0.5 gram of sodium hydrosulfite are mixed in a mortar to produce a substantially homogenous powder. To this mixture are added 11 cc. of a pre-cooled glycerol-water solution containing at least 20% of glycerol. The resulting mixture is well stirred until a uniform paste is obtained. The mortar may be encased in an ice bath to prevent the temperature from rising substantially above 40° C. The resulting pasty mix is then spread out on glass trays and dried under vacuum or in a desiccator in the presence of a suitable dehydrating agent. Drying at slightly elevated temperature not to exceed 50 to 60° C. shortens the time of dehydration. The hydrosulfite in the reaction mixture prevents the mix from becoming discolored. The dried material is a white or substantially white granular powder assaying approximately 36 to 40% ascorbic acid and 9 to 10% of calcium. The product is stable in dry form. It is substantially completely soluble in water, and a 5 to 10% solution will have a pH of approximately 8 to 9.

The pH of the mix can be controlled to a great extent by varying the proportion of calcium hydroxide. The theoretical quantity of calcium hydroxide to be applied to the amounts of the other acid ingredients in the foregoing three examples is approximately 7.4 grams. The amounts of calcium hydroxide actually used, therefore, constitutes an excess of about from 8 to 15%. When the theoretical quantity of calcium hydroxide is used, substantially the same double salt is formed, but the product has an acid reaction of a pH of approximately 6.0 to 7.

*Example 4.*—18 grams of acetyl salicylic acid, 18.2 grams of ascorbic acid, 8 grams of calcium hydroxide powder (95%), and 0.5 gram of sodium hydrosulfite are mixed together in the same manner as described in the previous examples. 11 cc. of water are then added and the mixture is triturated until a pasty mass is obtained. During the reaction the mixture is cooled as heretofore described. The product is then dried in a vacuum desiccator in the presence of calcium chloride to give a white granular powder, with a yield of 100% of the theory. The salt is substantially completely soluble in water. A 5% solution has a pH of approximately 6.0. The product assays from 36 to 40% ascorbic acid.

*Example 5.*—18 grams of acetyl salicylic acid, 18.2 grams of ascorbic acid, and 0.25 gram of sodium hydrosulfite are thoroughly mixed in a mortar or other suitable vessel which may be cooled in an ice bath. To this mixture is added a suspension of 8.5 grams of calcium hydroxide (95%) in 14 cc. of a cold water-glycerol solution containing approximately 20% glycerol. The mixture is thoroughly pounded until a pasty mass is obtained, while the temperature is not allowed to rise above 40°. The pasty mass is then spread out on trays as heretofor described in the previous examples. The dried product comprises a white granular mass which is soluble in water to give a colorless clear solution having a pH of 6.0 to 7.0 in a 5% concentration. The product assays from 34 to 36% ascorbic acid.

*Example 6.*—18 grams of acetyl salicylic acid, 18.2 grams of ascorbic acid, and 0.25 gram of sodium hydrosulfite are thoroughly mixed in a mortar surrounded by an ice bath; and 8.5 grams of calcium hydroxide powder (95%) are suspended in 12 cc. of ice cold water. This suspension is added to the powder mix with thorough agitation to give a creamy or pasty mass. The reaction temperature can be controlled by the speed with which the suspension of calcium hydroxide is added and the efficiency of the mixing operation. In general, however, this method depresses the temperature to a larger extent than the addition of water to the initially incorporated calcium hydroxide with the other reacting ingredients. The pasty mass is dried as heretofore described and gives a substantially theoretical yield of a white to creamy white granular product. The salt is practically completely soluble in water, giving a clear solution having a pH of approximately 6.3 to 7.0. The product made by this method assays 38 to 42% ascorbic acid.

All the products obtained by the methods of the foregoing 6 examples represent the double salt of calcium acetyl salicylate and ascorbate.

*Example 7.*—13.81 grams of salicylic acid, 17.6 grams of ascorbic acid, 8.17 grams of calcium hydroxide powder (95%), and 0.5 gram of sodium hydrosulfite are thoroughly mixed in a mortar surrounded by an ice bath. To this mixture are added 11 cc. of an aqueous glycerol solution and the mixture is triturated until a pasty mass is obtained. The product is then dried in the same manner as previously described and gives a substantially theoretical yield of a white to creamy white granular powder. The dried salt is practically completely soluble in water, and its 5% solution has a pH of 8 to 8.8. The ascorbic acid content is over 40%. The amount of calcium hydroxide used in this example is about 10% in excess of the stoichiometric requirement.

*Example 8.*—13.81 grams of salicylic acid, 17.6 grams of ascorbic acid, and 0.5 gram of sodium hydrosulfite are mixed together in a mortar or other suitable vessel and cooled in an ice bath. To this mixture is added a suspension of 7.8 grams of calcium hydroxide powder (95%) in 10 cc. of water with simultaneous trituration until a pasty mass is obtained. The temperature does not rise substantially above 30° C. The product is then dried in the usual manner to give a practically theoretical yield of a white to grayish white granular powder. The product is substantially completely soluble in water and has a pH of approximately 5 to 6 in a 5% solution. The product assays about 42% ascorbic acid.

The compounds described in the last two examples represent a calcium ascorbo-salicylate. While this latter salt appears to have a slightly lower solubility in water than calcium ascorbo-acetyl-salicylate, its aqueous solution is relatively more stable than that of the acetyl derivative. This is of great practical importance for pharmaceutical purposes where stability is a decisive criterion of the value of a preparation.

The amounts of calcium hydroxide to be used in forming the calcium ascorbo-salicylate may vary between the figures as given in the last two examples. Best results are obtained, however, when a slight excess over the stoichiometric amount is used. This imparts to the product a slightly alkaline pH rendering it more stable than one having an acid reaction.

While I have described in the foregoing examples various embodiments and features of my improved method and compounds, it is to be understood that I shall not be limited thereto and that there be included as part of the invention all such changes and modifications thereof as would occur to a person skilled in the art to which this invention pertains and as would fall within the scope of the claims. In particular, the method described may be applied to the formation of all double salts of ascorbic acid and those salicylic compounds which have a free and reactive nuclearly attached carboxylic group, as for instance free salicylic acid, its acyl-derivatives such as acetyl-salicylic acid, methylene-citryl-salicylic acid, phenol substituted aryl derivatives and related substances. It is also intended that other metals than calcium may form in whole or in part the base of the double salts. Thus, calcium may be replaced by other divalent metals such as magnesium, or monovalent cations such as sodium, potassium, lithium or ammonium.

The double salts possess valuable pharmaceutical properties. They are indicated in all those ailments which call for a prolonged and efficient salicylate therapy and a simultaneous replenishment of the rapidly decreasing vitamin C, supplies.

Having thus described my invention, what I claim as new and desire to secure by Letters Patent is:

1. A method of preparing double salts of ascorbic and salicylic acid compounds, consisting of mixing ascorbic acid, a salicylic acid derivative having a free carboxyl group, and an alkaline earth base, and adding a relatively small amount of water, thereby converting said mixture into a pasty mass of flowable consistency at normal temperature, whereby an exothermic reaction is induced resulting in the formation of the double salt.

2. A method of preparing double salts of ascorbic and salicylic acid compounds, consisting of mixing ascorbic acid, a salicylic acid derivative having a free carboxyl group, a reducing agent, and an alkaline earth base, and adding a relatively small amount of water, thereby converting said mixture into a pasty mass of flowable consistency at normal temperature, whereby an exothermic reaction is induced resulting in the formation of the double salt.

3. A method of preparing double salts of ascorbic and salicylic acid compounds, consisting of mixing ascorbic acid, a salicylic acid derivative having a free carboxyl group, a polyhydroxy alcohol, and an alkaline earth base, and adding a relatively small amount of water, thereby converting said mixture into a pasty mass of flowable consistency at normal temperature, whereby an exothermic reaction is induced resulting in the formation of the double salt.

4. A method of preparing double salts of ascorbic and salicylic acid compounds, consisting of mixing ascorbic acid, a salicylic acid derivative having a free carboxyl group and an alkaline earth base, and adding a relatively small amount of an aqueous glycerol solution, thereby converting said mixture into a pasty mass of flowable consistency at normal temperature, whereby an exothermic reaction is induced resulting in the formation of the double salt.

5. A method of preparing calcium ascorbo-acetylsalicylate, consisting of mixing ascorbic acid, acetylsalicylic acid, and calcium hydroxide, and adding a relatively small amount of water, thereby converting said mixture into a pasty mass of flowable consistency at normal temperature, whereby an exothermic reaction is induced resulting in the formation of calcium ascorbo-acetyl-salicylate.

6. A method of preparing calcium ascorbo salicylate, consisting of mixing ascorbic acid, salicylic acid, and calcium hydroxide, and adding a relatively small amount of water, thereby converting said mixture into a pasty mass of flowable consistency at normal temperature, whereby an exothermic reaction is induced resulting in the formation of calcium ascorbo-salicylate.

7. A method of preparing calcium salts of ascorbic and salicylic acid compounds, consisting of mixing substantially reactively equivalent proportions of ascorbic acid, a salicylic acid derivative having a free carboxylic group, and calcium hydroxide, and adding a relatively small amount of water, thereby converting said mixture into a pasty mass of flowable consistency at normal temperature, whereby an exothermic reaction is induced resulting in the formation of the calcium double salts.

8. A method of preparing calcium ascorbo acetyl-salicylate consisting of mixing substantially equal parts by weight of ascorbic acid and acetylsalicylic acid with calcium hydroxide, and adding a relatively small amount of water, thereby converting said mixture into a pasty mass of flowable consistency at normal temperature, whereby an exothermic reaction is induced resulting in the formation of calcium ascorboacetylsalicylate.

9. A method of preparing calcium ascorboacetylsalicylate consisting of mixing substantially equal parts by weight of ascorbic acid and acetylsalicylic acid, and adding a suspension of calcium hydroxide in a relatively small amount of water, thereby converting said mixture into a pasty mass of flowable consistency at normal temperature, whereby an exothermic reaction is induced resulting in the formation of calcium ascorboacetylsalicylate.

10. A method of preparing calcium ascorbosalicylate consisting of mixing substantially stoichiometric proportions of ascorbic acid and salicylic acid, and adding a suspension of calcium hydroxide in a relatively small amount of water, thereby converting said mixture into a pasty mass of flowable consistency at normal temperature, whereby an exothermic reaction is induced resulting in the formation of calcium ascorbosalicylate.

JOEL G. FREEMAN.

REFERENCES CITED

The following references are of record in the file of this patent:

UNITED STATES PATENTS

| Number | Name | Date |
|---|---|---|
| 2,159,214 | Klein | May 23, 1939 |
| 2,187,467 | Stuart | Jan. 16, 1940 |

OTHER REFERENCES

The Merck Index, 5th edition, pages 7 and 59.